(12) United States Patent
Le Biannic

(10) Patent No.: US 8,392,362 B2
(45) Date of Patent: Mar. 5, 2013

(54) SYSTEMS AND METHODS ASSOCIATED WITH HYBRID PAGED ENCODING AND DECODING

(75) Inventor: Yann Le Biannic, Suresnes (FR)

(73) Assignee: SAP France S.A., Levallois-Perret (FR)

( * ) Notice: Subject to any disclaimer, the term of this patent is extended or adjusted under 35 U.S.C. 154(b) by 426 days.

(21) Appl. No.: 12/427,264

(22) Filed: Apr. 21, 2009

(65) Prior Publication Data

US 2010/0268695 A1     Oct. 21, 2010

(51) Int. Cl.
*G06F 7/00*     (2006.01)
(52) U.S. Cl. ........................................... 707/609
(58) Field of Classification Search .................. 707/609
See application file for complete search history.

(56) References Cited

U.S. PATENT DOCUMENTS

| | | | | |
|---|---|---|---|---|
| 6,166,664 A | * | 12/2000 | Acharya | 341/63 |
| 2003/0223578 A1 | * | 12/2003 | Stevens | 380/28 |
| 2010/0023579 A1 | * | 1/2010 | Chapweske et al. | 709/203 |

OTHER PUBLICATIONS

"Bitmap Index", Wikipedia, the free encyclopedia, Apr. 16, 2009, Retrieved Apr. 21, 2009, download from http://en.wikipedia.org/wiki/Bitman.index, 4pgs.

Ali Pinar et al., "Compressing bitmap indices by data reorganization", Lawrence Berkeley National Laboratory, Year 2004, Paper LBNL-55690, (pp. 1-12 + cover 1pg. + abstract 1pg., total 14 pages).

* cited by examiner

*Primary Examiner* — Truong Vo
(74) *Attorney, Agent, or Firm* — Buckley, Maschoff & Talwalkar LLC

(57) ABSTRACT

According to some embodiments, a system, method, means, and/or computer program code are provided to facilitation a compression of information. In some cases, uncompressed data may be divided into a plurality of portions. A first data density value may be determined for a first portion, and a second data density value may be determined for a second portion. Based on the first data density value, the first portion may be encoded using a first encoding technique. Similarly, the second portion may be encoded using a second encoding technique based on the second data density value. A compressed representation of the uncompressed data may then be stored in accordance with results of said encodings of the first and second portions.

17 Claims, 8 Drawing Sheets

SYSTEMS AND METHODS ASSOCIATED WITH HYBRID PAGED ENCODING AND DECODING

FIELD

Some embodiments of the present invention relate to systems and methods associated with the compression of information. For example, some embodiments relate to systems and methods to facilitate an encoding of different portions of a bitmap index using different encoding techniques.

BACKGROUND

In some cases, it may be desirable to create a compressed version of data. For example, a business intelligence application might create a compressed version of a warehouse data index to reduce an amount of memory or disk space required to store the index and/or to improve performance of the application.

The use of a single encoding technique to compress such information, however, may have disadvantages. For example, one encoding technique might be inefficient when the density of the information is relatively low (e.g., the information includes many long strings of "1" or "0"). Similarly, another encoding technique might be inefficient when the density is relatively high (e.g., the information is more random in nature).

It would therefore be desirable to provide improved methods and systems that facilitate the compression of information such as business data in an efficient manner.

DETAILED DESCRIPTION

Figure 1:
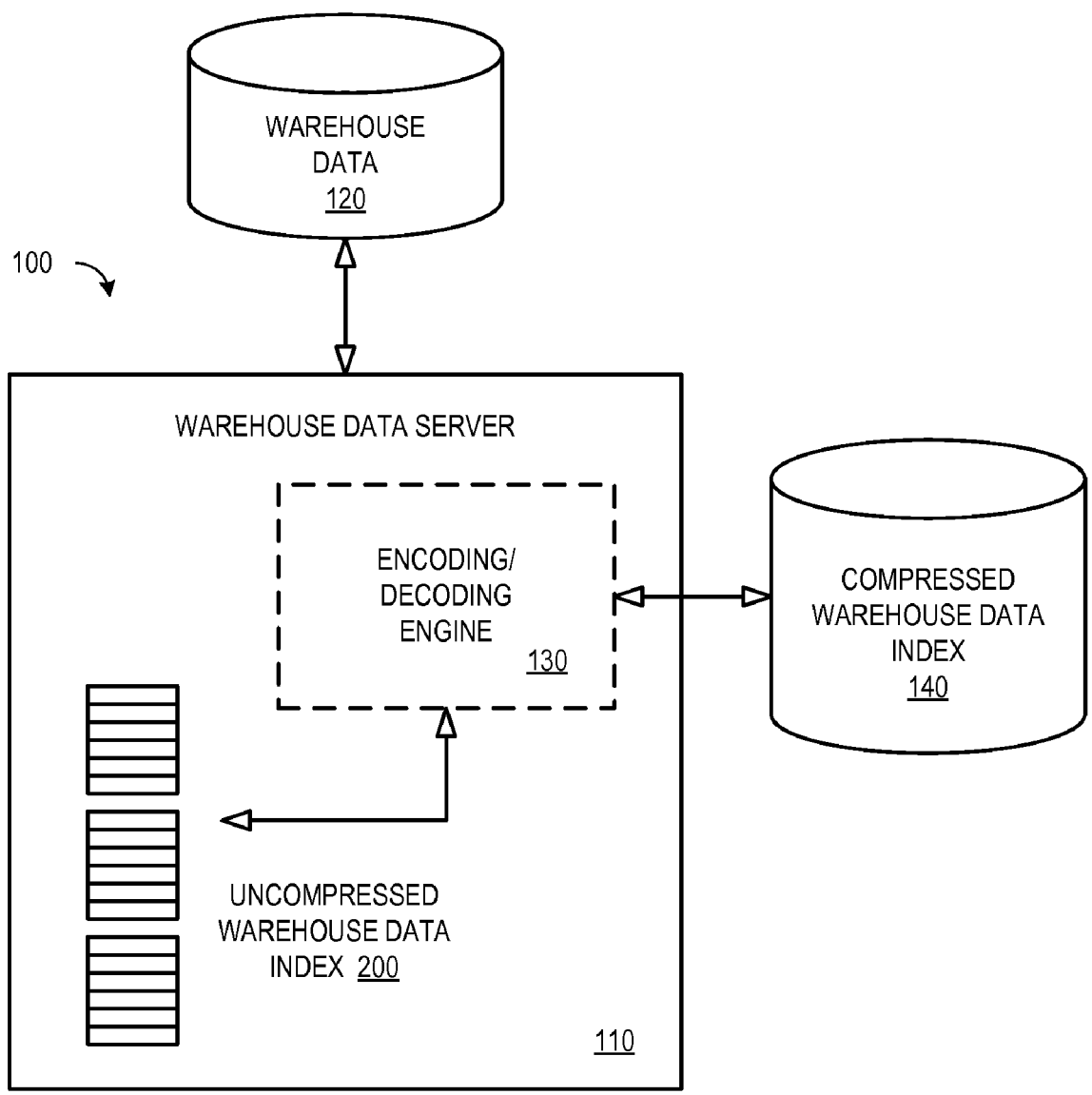
FIG. 1 is a diagram of a system according to some embodiments of the present invention.

To alleviate problems inherent in the prior art, some embodiments of the present invention introduce systems, methods, computer program code and/or means to facilitate a compression of information. For example, FIG. 1 is a diagram of a system 100 according to some embodiments of the present invention. The system 100 includes a warehouse data server 110 able to exchange information with warehouse data 120 (e.g., locally or remotely stored warehouse data 120). The warehouse data 120 may comprise, for example, business information associated with a multi-dimensional database. Note that warehouse data 120 may be associated with a table of structured data that can be represented as a set of "rows." By way of example only, a business intelligence application may have dimensions with between 2 and 100,000 leaves with almost full ordering in some dimensions (e.g., time) and partial ordering in other dimensions (e.g., batches of data coming from different geographic regions).

Figure 2:
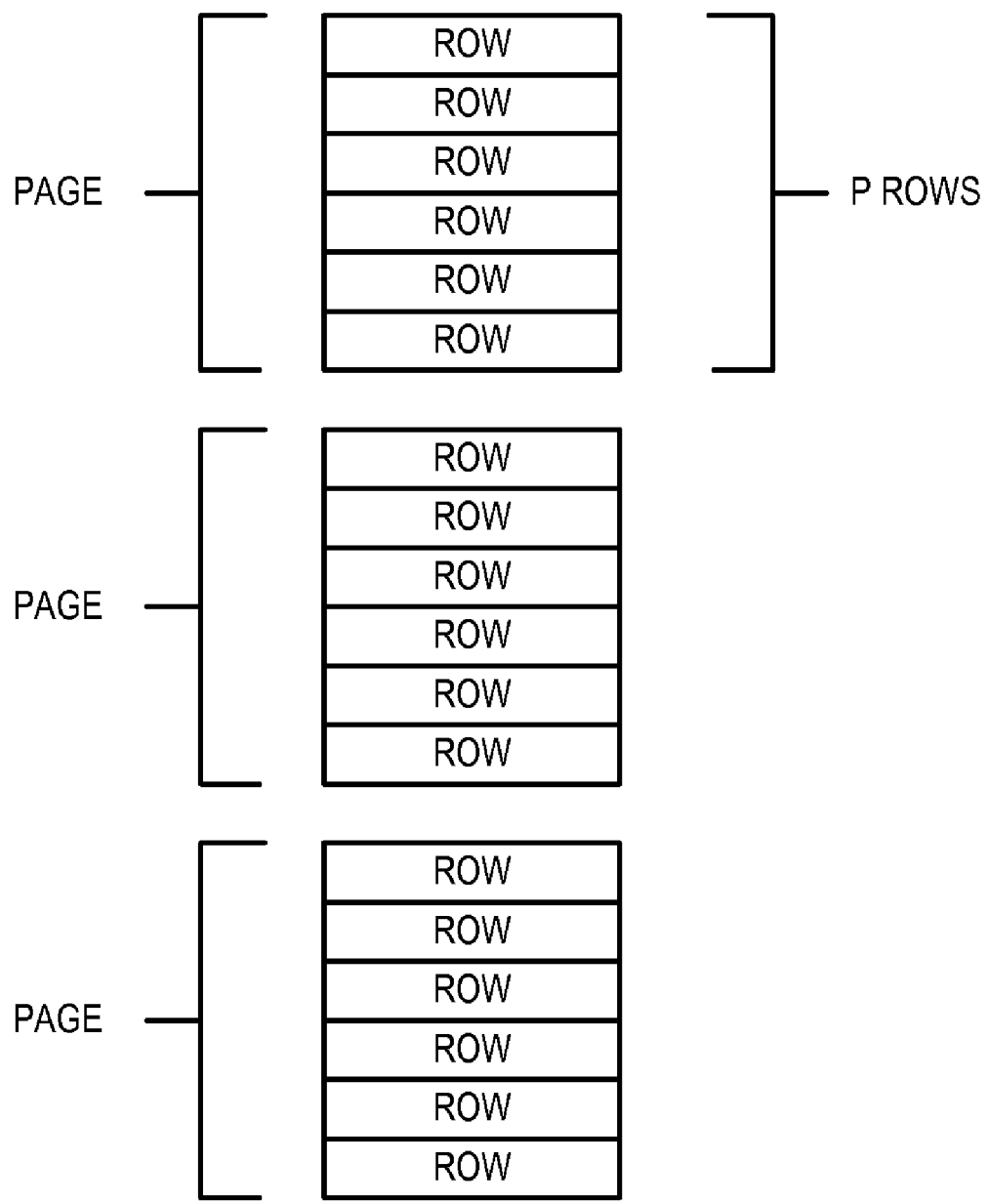
FIG. 2 illustrates an uncompressed warehouse data index.

In some cases, the warehouse data server 110 may generate a warehouse data index 200. The warehouse data index 200 might represent, for example, a bitmap index where each index entry describes a key and a sequence of row numbers associated with the warehouse data 120 that contain the key. FIG. 2 illustrates one example of the uncompressed warehouse data index 200.

Note that the warehouse data index 200 may contain a substantial amount of information. As a result, an encoding decoding engine 130 may generate and store a compressed warehouse data index 140. The compressed warehouse data index 140 may, for example, reduce an amount of disk space (or memory) that is needed to store the information and/or improve the performance of a business application that uses the information (e.g., that copies or manipulates the information).

Figure 3:
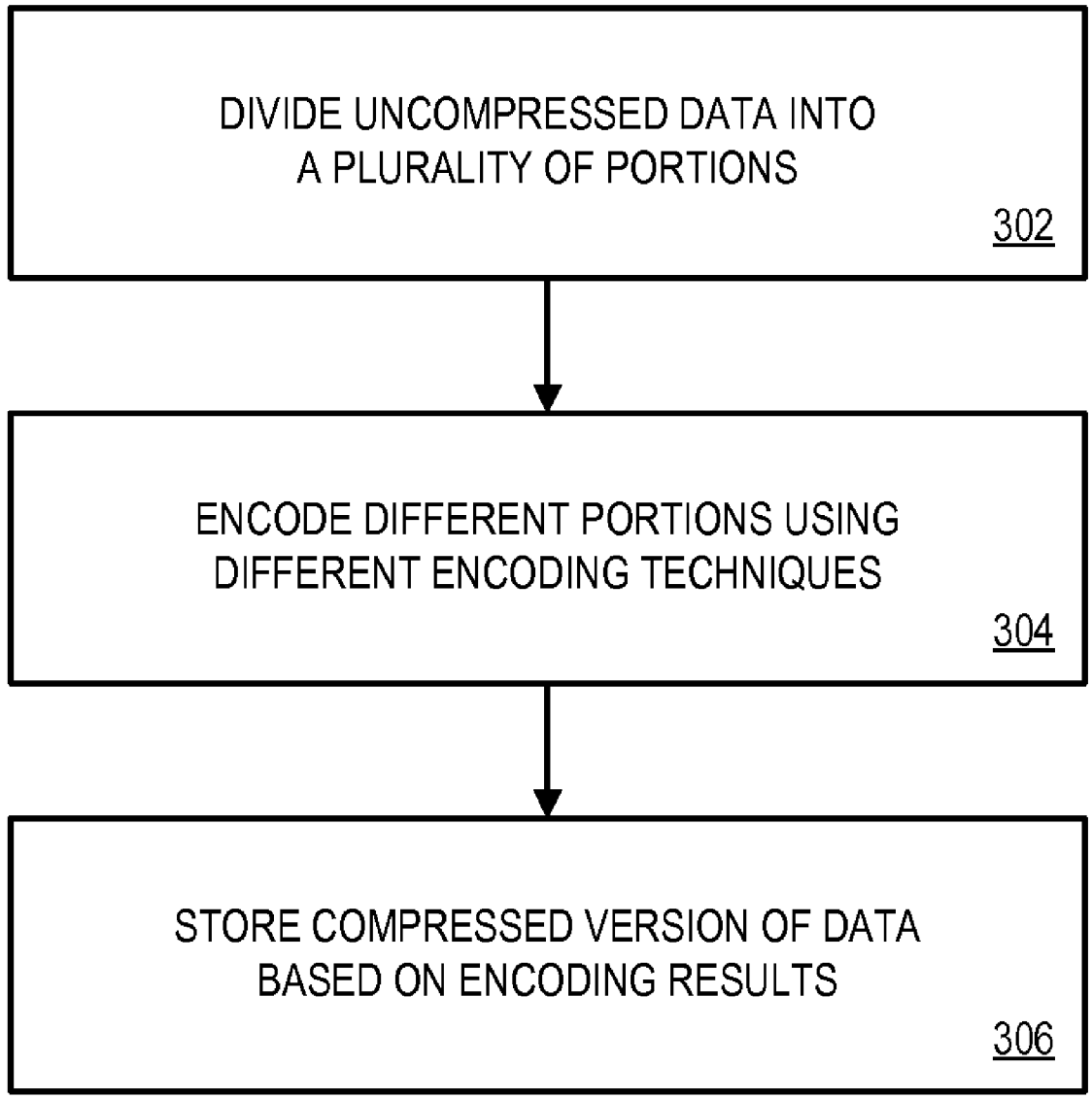
FIG. 3 is a flow diagram of a method according to some embodiments of the present invention.

To facilitate the compression of information (such as the warehouse data index 200), the system 100 may implement a method such as one illustrated in FIG. 3. The flow charts described herein do not necessarily imply a fixed order to the actions, and embodiments may be performed in any order that is practicable. Note that any of the methods described herein may be performed by hardware, software (including low level language code), or any combination of these approaches. For example, a storage medium may store thereon instructions that when executed by a machine result in performance according to any of the embodiments described herein.

At 302, uncompressed data may be divided into a plurality of portions (and each portion represents less then the entire set of uncompressed data). Consider again the uncompressed warehouse data index 200 of FIG. 2. In that example, the data index 200 may be divided into a number of "pages," where each page includes a predetermined number P of rows. Although three pages are illustrated in FIG. 2, note that the data index 200 might include any number of pages (and that each page may include any number of rows).

At 304, different portions are encoded using different encoding techniques. For example, a first portion might be encoded using a bit map encoding technique while a second portion is encoded using a run length encoding technique. Note that embodiments described herein may be associated with any of a number of different encoding and decoding techniques. By way of example only, Byte-aligned Bitmap Compression ("BBC") and/or Word-Aligned Hybrid ("WAH") encoding techniques might be associated with some embodiments. The compressed version of the data may then be stored at 306 based on the encoding results. For example, a compressed warehouse data index may be stored in memory or on a disk drive.

Figure 4:
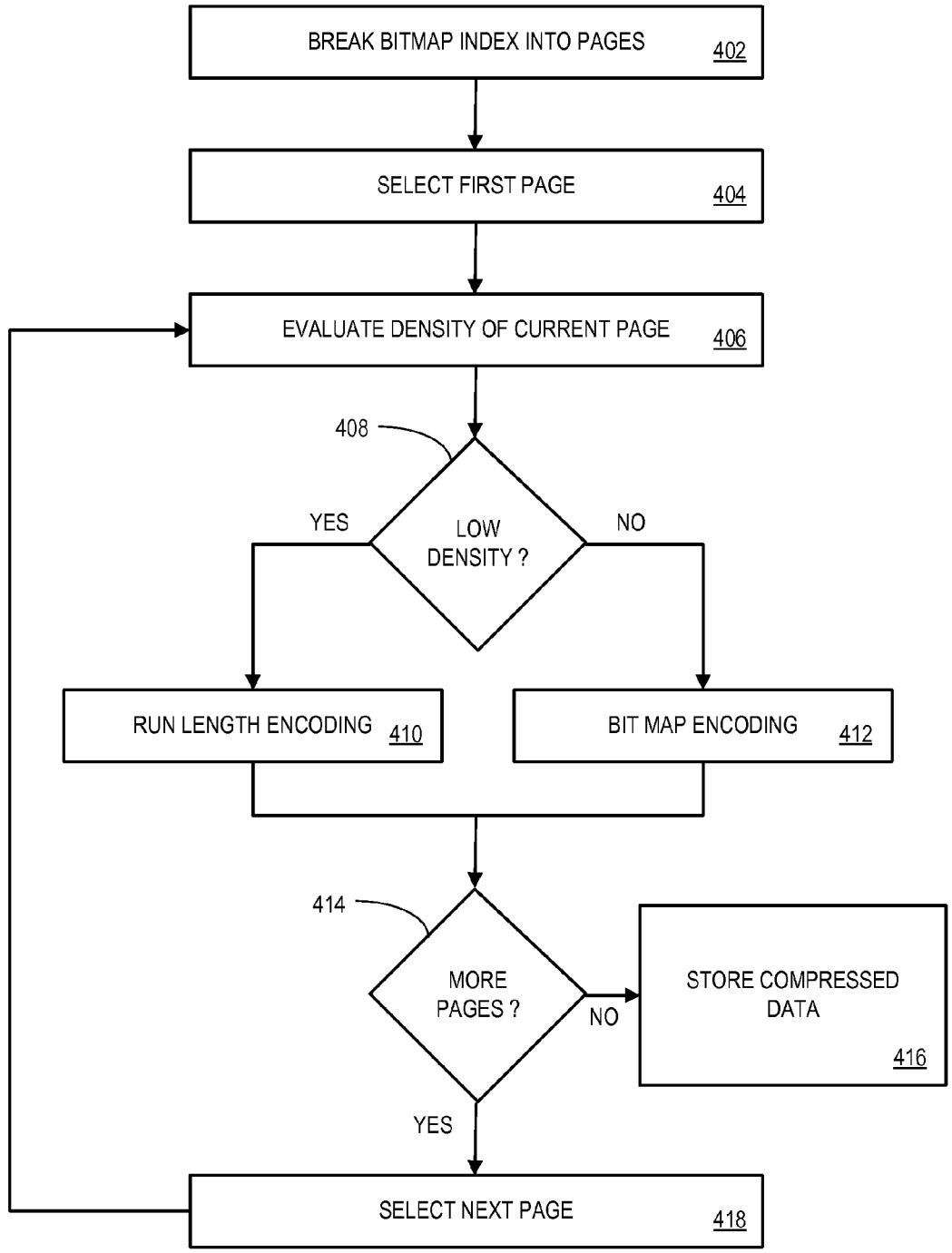
FIG. 4 is a flow diagram of a method of compressing information according to some embodiments.

The determination of which encoding technique will be applied to various portions of the data may be based on, for example, a density of information associated with each portion. For example, FIG. 4 is a flow diagram of a method of compressing information according to some embodiments. At 402, a bitmap index is broken into a plurality of pages, and the first of those pages is selected at 404.

At 406, the information density of the current page (e.g., the first page) is evaluated. By way of example, a density value for the page may be calculated based on a number of significant rows divided by the total number of row that can be represented in a page.

At 408, it is determined whether or not the current page should be considered a relatively "low information density page" (e.g., when a density value is below a pre-determined threshold value). If so, run length encoding is performed on the page at 410. If the current page should not be considered a relatively low information density page (e.g., when a density value is above a pre-determined threshold value), bitmap encoding may be performed on the page at 412.

If there are more pages of uncompressed data to process at 414, the next page may be selected at 418 and the process may repeat at 406 (e.g., the information density of the new page will be evaluated). When there are no more pages of uncompressed data to process at 414, the compressed data may be stored at 416.

Figure 5:
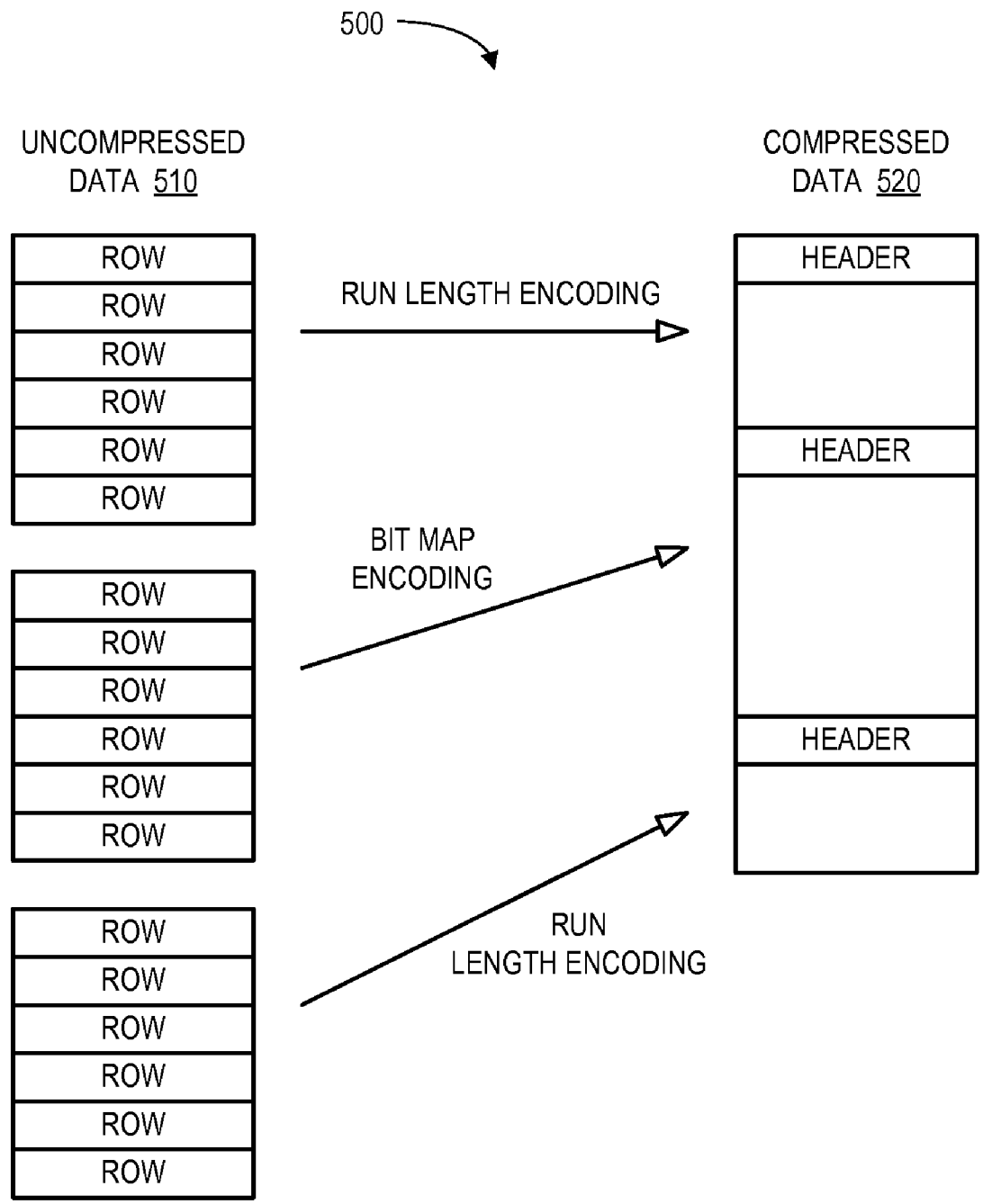
FIG. 5 illustrates an encoding of information in accordance with some embodiments.

FIG. 5 is an example 500 of an encoding of information in accordance with some embodiments. In this case, the uncompressed data 510 includes a number of rows that have been broken up into pages (each page including P rows). The first (top) page has been compressed using run length encoding and stored as compressed data 520. The second (middle) page has been compressed using bit map encoding and stored as compressed data 520. Finally, the third (bottom) page has been compressed using run length encoding and stored as compressed data 520. According to some embodiments, each portion of that compressed data 520 associated with a page of uncompressed information includes a "header" indicating which encoding technique was used to compress the data.

Although two particular encoding techniques have been described with respect to FIGS. 4 and 5 by way of example, note that embodiments may be associated with any number of different types of encoding approaches (e.g., the system might select from three or five potential encoding techniques).

Efficient techniques for indexing relatively large volumes of structured data may, for example, reduce the response time of business intelligence applications that use the data. For example, embodiments described herein may speed-up a selection of a subset of available data by means of a filter condition (e.g., prior to applying operations such as projection and aggregation).

One example of an encoding process in accordance with some embodiments of the present invention will now be described. Note that a table of structured data may be represented as a set of rows, and an index entry may consist of a key value and references to the rows that contain the key value. The reference part of the index entry may be equivalent to, for example, an ordered set of row numbers.

One encoding technique may represent a set of natural numbers as a bitmap, where a "1" bit at the nth position denotes that the nth row contains the key value. Bitmap encoding may provide an efficient compression when the density of information is high. It may also allow the implementation of relatively fast logical AND and OR operations. However, such a technique may be less efficient for the relatively sparse indexes that may be encountered in data warehouses.

Another encoding technique is Run Length Encoding ("RLE"), where a sequence of natural numbers is first represented as a bitmap, and then the intervals between significant bits are encoded as binary words. This technique may be efficient for relatively sparse indexes, but the compression factor and the performance of logical operations may degrade as the density of information in the index increases.

Note that neither bit map nor run length encoding might exploit a partial ordering of the indexed data, and further that data in a data warehouse is often oriented according to time, geographic, and organizational structures.

According to some embodiments of the present invention, a hybrid compression technique may be provided that mixes bitmap and run length encodings on a paged decomposition of a set of integers to be encoded. A consequence of partial ordering may be that the information is sparse in large areas of the row set and dense in others. The proposed encoding approaches described herein may leverage this property by choosing an appropriate base encoding depending on the local density of information (e.g., on a page-by-page basis). The pagination of an index contents may also provide that each part of the index (and the rows that it references) may be processed in parallel.

Since a single compression technique is used for any input page, only one tag per page may be need to encode the technique. Moreover, a page will typically hold the equivalent of a large number of bitmap words, or a large number of run length encoding intervals. As a consequence, an overhead induced by the encoding tag may be relative low with respect to common cases encountered in business intelligence applications.

According to some embodiments, an encoding engine may first split index entry content into fixed-size pages, each page holding the index entry information for a fixed number P of contiguous rows. For each page, the density of information may be analyzed (e.g., the number of significant rows over the total number of rows that can be represented in the page may be calculated). For an index page that references relatively few of the P rows, the significant rows are the rows that are referenced (equivalent to ones in a bitmap encoding). For a page that references relatively many of the P rows, the significant rows are the rows that are not referenced (equivalent to zeroes in a bitmap encoding).

Low density pages may be encoded using the run length encoding technique, using fixed-sized unsigned words of N bits to encode the intervals between significant row numbers. The maximum interval that may be encoded using an unsigned word of N bits is $2^N-1$, thus there may be a constraint between the size P of a page (expressed as a number of row numbers) and the size N of a word (expressed as a number of bits): $P \leq 2^N-1$.

High density pages may be encoded using bitmap encoding. A page holding up to P row numbers as words of N bits may thus be represented by P/N words.

The differentiation between bitmap and run length encodings may be provided by the first word of a page encoding as follows:

A 0 word may denote a bitmap encoded page,

A positive signed word X, with X lower or equal to $2^{N-1}-1$, may indicate a run length encoded page that contains X encoded intervals between significant values, A negative signed word X, with $-(2^{N-2}) \leq X < 0$, may indicate a sequence of -X empty pages, and A negative signed word X, with $-(2^{N-1}) \leq X < -(2^{N-2})$, may indicate a sequence of $-X-(2^{N-2})$ full pages.

Since base bitmap encoding and run length encoding are naturally word-aligned, the encoding and decoding of index contents pages may be efficiently implemented on word-based Central Processing Units (8, 16, 32 or 64 bits CPUs, and more generally any word-based CPU). Moreover, the size of a page (as well as the size of the word used in the base run length encoding) may be adapted to the appropriate hardware.

According to some embodiments, the encoding uses binary words with a fixed number N of bits. These binary words may usually be signed, except for the representation of bitmaps where they are unsigned. By way of example, words where N=32 bits may be used.

Each index entry may consist of a key and the sequence of row numbers that contain that key. Some embodiments provided herein split a sequence of row numbers into pages of P rows, where the nth page references all the rows whose number is within the range $[n \cdot P, (n+1) \cdot P-1]$. For example: let P=8 for a row set that contains at most 16 rows. Each index entry may have its contents represented by two pages p1 and p2. Page p1 will contain all references to rows whose row number is in the range [0, 7], and page p2 will contain all references to rows whose row number is in the range [8, 15]. Assuming a key K contained in the rows {0, 1, 7, 9, 12}:

$p1(K)=\{0,1,7\}, p2(K)=\{9,12\}$.

When the bitmap encoding is used, a page representing P row numbers may be represented as a binary sequence of P bits. A bit at the nth position represents the presence or absence of the row whose row number is n relatively to the beginning of the page. For example, let p1(K)={0, 1, 7} and p2(K)={9, 12}. In this case, the equivalent bit map encoding is:

P1(K): 11000001
P2(K): 01001000

According to some embodiments, each bitmap encoding a page is preceded by a binary word whose decimal value is zero.

A used herein, a bit may be "significant" when it breaks a sequence of identical bits. For instance, a one bit following a sequence of zeroes is significant. Similarly, a zero following a sequence of ones is a significant bit. For example, in the bitmap 00011110 10010001, the only significant bits are the fourth, eighth, tenth, twelfth and sixteenth bits (underlined).

A run length encoding technique may encode the size of each sequence of bits leading to a significant bit. The size may be encoded as a positive signed binary word when it used to describe a sequence of ones followed by a zero. It may be encoded as a negative signed binary word when it is used to describe a sequence of zeroes followed by a one. For example, the bitmap 0001111010010001 may be encoded as the following sequence of decimal numbers: {−3, 3, 1, −1, −3}.

If the decimal numbers are represented by binary words of 8 bits, then the binary representation of the above sequence of numbers is:

11111101 00000011 00000001 11111111 11111101

In this example, the run length encoding is less efficient than a bitmap encoding, since it requires five bytes whereas the bitmap encoding requires only two bytes.

The bitmap 00000000 00000001 contains only one significant bit; is encoded as {−15} in decimal representation, and 11110001 as a signed binary word of 8 bits. In this example, the run length encoding twice more compact than the bitmap encoding.

Trailing bits after the last significant bit in an input flow of bit might not be encoded if they are the one's complement to the last significant bit. If they are identical to the last significant bit, then the size of the sequence of trailing bits may be encoded as a negative binary word for a sequence of zeroes, and by a positive binary word for a sequence of ones. For example, in the bitmap 00010000, the only significant bit is the fourth bit, the four trailing zeroes are not encoded, thus the encoding of this bitmap is {−3} in a decimal representation. In the bitmap 00011111, the four trailing ones are identical to the last significant bit, thus the encoding of the bitmap is {−3, 4} in a decimal representation. According to some embodiments, the number of words used in the run length encoding of a page are encoded as a positive signed binary word.

Some embodiments of the present invention may further provide for the occurrence of empty and full pages. For example, a sequence of n empty pages might be represented by the negative number −n, encoded as a signed binary word. Similarly, a sequence of n full pages may be represented by the negative number $-n-2^{N-2}$, where N is the size of words produced by the encodings.

At most $2^{N-2}$ empty or full pages can be encoded this way. If the source input contains more than $2^{N-2}$ empty or full pages, then it is represented as multiple sequences of at most $2^{N-2}$ pages.

Let P be the number of rows in a page, and N the number of bits in an encoded binary word. Encoding a sequence of pages may implement the following rules:
  A sequence of empty or full pages is encoded by a single negative signed word (previously described),
  If a page is neither empty nor full, it is initially encoded using a run length encoding,
  If the number of words X in the run length encoded page is lower than P/N, then the final encoding is X encoded as a signed word, followed by the X words of the run length encoded page, and
  If the number of words in the run length encoded page is greater than P/N, then page is re-encoded as a bitmap, and the final encoding is the 0 word followed by the bitmap representation of the page.

With respect to rules for decoding a sequence of row numbers, let P be the number of rows in a page, and N the number of bits in an encoded binary word. In this case, decoding a sequence of pages may implement the following rules:
  A negative signed word X such than $-(2^{N-2}) \leq X<0$ indicates a sequence of −X empty pages,
  A negative signed word X such than $-(2^{N-1}) \leq X<-(2^{N-2})$ indicates a sequence of $-X-2^{N-2}$ full pages,
  A 0 word indicates that the following P/N words are the bitmap representation of a page, and
  A positive signed word X indicates that the following X words are a run length encoded representation of a page.

In this way, some embodiments of the present invention may efficiently encode warehouse data indexes by exploiting the typical partial ordering (as data warehouses are often oriented according to time, geography and organizational structures). A hybrid compression technique that mixes bitmap and run length encodings on a paged decomposition of the set of integers to be encoded may leverage the fact that information is sparse in large areas of the row set and dense in others by choosing the best base encoding depending on the local density of information, page by page. The pagination of the index contents may also provide that each part of the index and the rows that it references can be processed in parallel.

Figure 6:
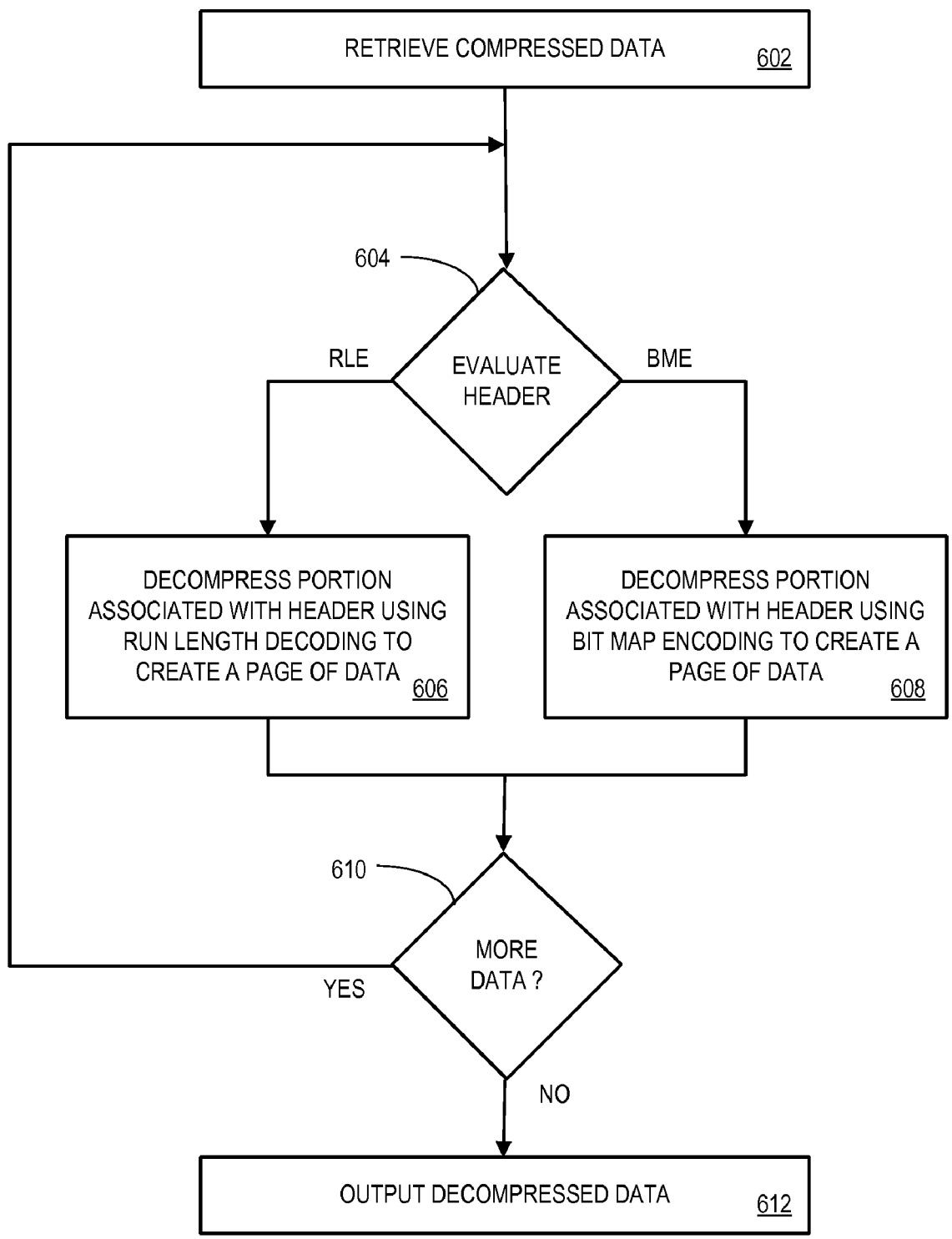
FIG. 6 is a flow diagram of a method of decompressing information according to some embodiments.

After the information is efficiently encoded and stored, embodiments may provide for the decoding (decompression) of the information. For example, FIG. 6 is a flow diagram of a method of decompressing information according to some embodiments. At 602, compressed data is retrieved (e.g., from a remote or local storage element). At 604, a header associated with a portion of the compressed data is evaluated.

If the header indicates that run length encoding was used to compress the data at 604, then the portion associated with the header is decompressed at 606 using run length decoding to create a page of uncompressed data. If the header indicates that bit map encoding was used to compress the data at 604, then the portion associated with the header is decompressed at 608 using bit map decoding to create a page of uncompressed data.

If there is more data to decompress at 610, the process continues at 604 (e.g., the next header may be evaluated). When there is no more data to decompress at 610, the decompressed data may be output at 612. Note that decompressed data may, according to some embodiments, be output before the entire set of compressed data has been processed.

Figure 7:
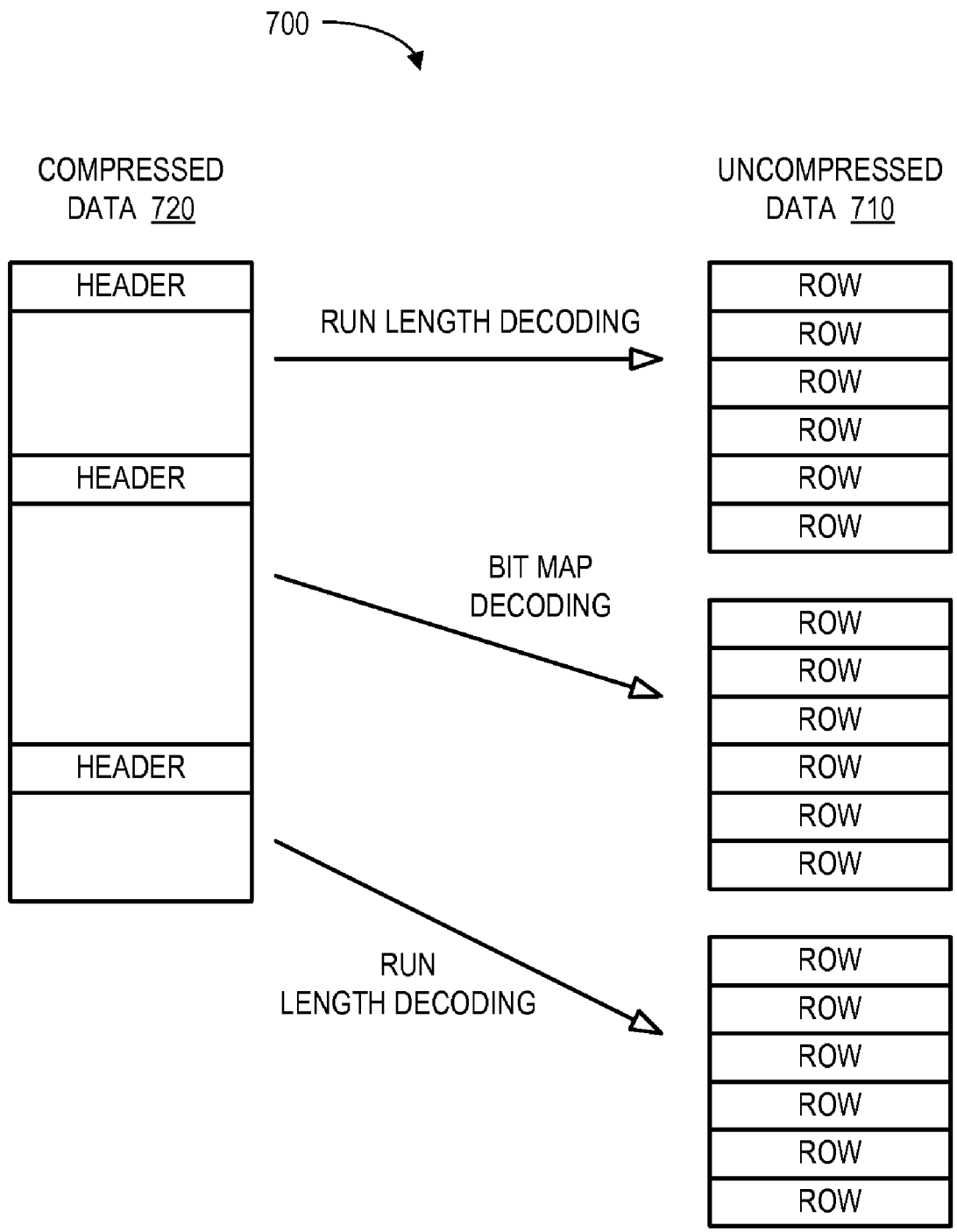
FIG. 7 illustrates a decoding of information in accordance with some embodiments.

FIG. 7 is an example 700 of a decoding of information in accordance with some embodiments. In this case, the compressed data 720 includes a number of headers, each associated with a portion of compressed data. The first (top) portion is decompressed using run length decoding and stored as a page of uncompressed data 710. The second (middle) portion has been decompressed using bit map decoding and stored as a page of uncompressed data 710. Finally, the third (bottom) portion has been decompressed using run length decoding and stored as a page of uncompressed data 710.

Figure 8:
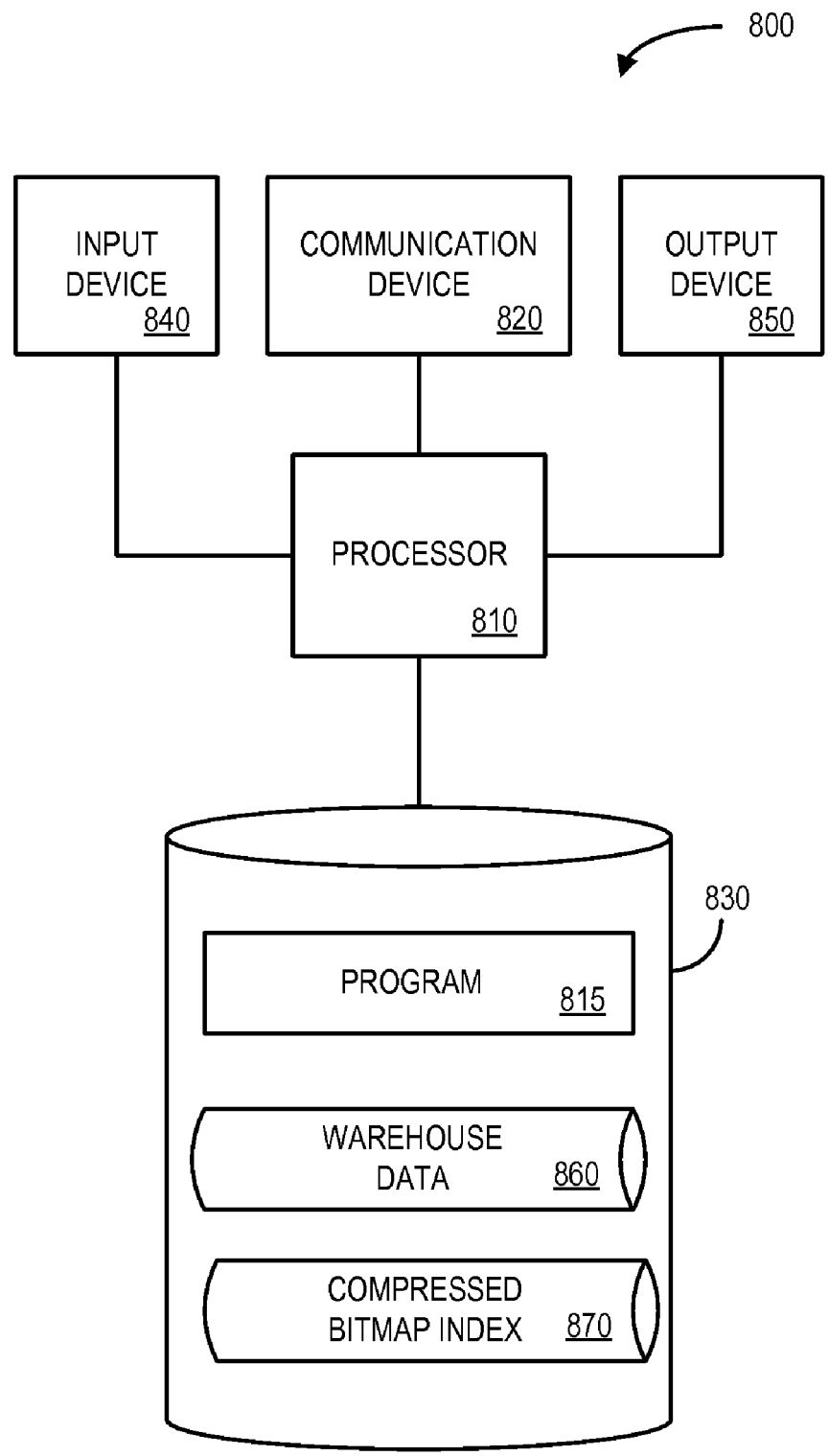
FIG. 8 is a block diagram of an apparatus in accordance with some embodiments of the present invention.

FIG. 8 is a block diagram of an apparatus 800 in accordance with some embodiments of the present invention. The apparatus 800 might, for example, execute a process such as the ones illustrated in FIGS. 2 and/or 3. The apparatus 800 comprises a processor 810, such as one or more INTEL® Pentium® processors, coupled to a communication device 820 configured to communicate via a communication network (not shown in FIG. 8). The communication device 820 may be used to communicate, for example, with remote user devices via the Internet.

The processor 810 is also in communication with an input device 840. The input device 840 may comprise, for example, a keyboard, a mouse, or computer media reader. Such an input device 840 may be used, for example, by an operator to define page parameters (e.g., to define word and/or row parameters) and/or encoding/decoding parameters (e.g., to indicate that three of five potential encoding techniques should be applied to a particular job). The processor 810 is also in communication with an output device 850. The output device 850 may comprise, for example, a display screen or printer. Such an output device 850 may be used, for example, to provide information about an encoding/decoding process to operators (e.g. indicating that a job reduced the size of an index by 25%).

The processor 810 is also in communication with a storage device 830. The storage device 830 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 830 stores a program 815 for controlling the processor 810. The processor 810 performs instructions of the program 815, and thereby operates in accordance any embodiments of the present invention described herein. For example, the processor 810 may divide uncompressed data into a plurality of portions. A first data density value may be by the processor 810 determined for a first portion, and a second data density value may be determined for a second portion. Based on the first data density value, the first portion may be encoded by the processor 810 using a first encoding technique. Similarly, the second portion may be encoded using a second encoding technique based on the second data density value. A compressed representation of the uncompressed data may then be stored by the processor 810 in accordance with results of the encodings of the first and second portions. The processor 810 may similarly implement any of the embodiments associated with a decoding of information described herein.

As used herein, information may be "received" by or "transmitted" to, for example: (i) the apparatus 800 from other devices; or (ii) a software application or module within the apparatus 800 from another software application, module, or any other source. As shown in FIG. 8, the storage device 830 may also store warehouse 860 according to some embodiments. The warehouse 860 may, for example, store business information about an enterprise. The storage device 830 may further store a compressed bitmap index 870 according to some embodiments. The compressed bitmap index 870 may, for example, store information indicating which rows of warehouse data 860 contain a particular key item. The illustration and accompanying descriptions of devices, methods, and databases presented herein are exemplary, and any number of other arrangements could be employed besides those suggested by the figures.

Thus, embodiments described herein may provide for an efficient way to compress and decompress information, such as a warehouse data index. Moreover, because different compression techniques are applied on a page-by-page basis embodiments may allow different pages to be simultaneously processed (e.g., by different threads or processors).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the applications and databases described herein may be combined or stored in separate systems). Similarly, although particular encoding/decoding techniques have been given as examples, other and/or additional techniques may be performed in accordance with any embodiments described herein.

Embodiments described herein may be useful in connection with, by way of example, business enterprise applications (e.g., associated with OLAP data). The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer-readable medium having stored thereon processor-executable instructions, to facilitate compression of information, that when executed by a processor result in the following:

dividing an uncompressed warehouse data index into a plurality of portions, each portion representing less than an entirety of the warehouse data index and each portion including a predetermined number of contiguous rows of the warehouse data index;

determining a first data density value associated with a first portion of the plurality of portions;

determining a second data density value associated with a second portion of the plurality of portions;

the determination of the first and the second data density values based on a number of significant rows divided by a total number of respective rows in respective first and second portions of the plurality of portions;

based on the first data density value, encoding the first portion using a first encoding technique to create a compressed, encoded representation of the first portion, wherein the first encoding technique is one of bitmap encoding and run length encoding;

based on the second data density value, encoding the second portion using a second encoding technique, different than the first encoding technique, to create a compressed, encoded representation of the second portion; and storing the first and second compressed, encoded representations of the uncompressed data in accordance with results of said encodings of the first and second portions.

2. The medium of claim 1, wherein each portion of the uncompressed warehouse data index comprises a page of warehouse data index entry information content.

3. The medium of claim 2, wherein the first encoding technique is associated with run length encoding, where a sequence of natural numbers is represented as a bitmap and intervals between significant bits are encoded as binary words.

4. The medium of claim 3, wherein the second encoding technique is associated with bitmap encoding, where a set of natural numbers is represented as a bitmap and an nth position denotes that an nth row contains a key value.

5. The medium of claim 4, wherein a portion is encoded using run length encoding when an associated data density value is below a pre-determined threshold.

6. The medium of claim 1, wherein execution of the instructions further results in:
determining that a series of portions are empty; and
encoding a third portion in accordance with the determination.

7. The medium of claim 1, wherein execution of the instructions further results in:
determining that a series of portions are full; and
encoding a third portion in accordance with the determination.

8. The medium of claim 1, wherein execution of the instructions further results in:
determining a third data density value associated with a third portion of the plurality of portions; and
based on the third data density value, encoding the third portion using a third encoding technique, different than the first and second encoding techniques, to create a compressed, encoded representation of the third portion.

9. The medium of claim 1, further comprising:
storing, for each portion, a header associated with an encoding technique.

10. The medium of claim 9, wherein the header comprises: (i) a zero indicating a bitmap encoded page, (ii) a positive signed word X, with X lower or equal to $2^{N-1}-1$, indicating a run length encoded page that contains X encoded intervals between significant values, (iii) a negative signed word X, with X lower than zero and higher or equal to $-(2^{N-2})$, indicating sequence of $-X$ empty pages, or (iv) a negative signed word X, with X lower than $-(2^{N-2})$ and greater or equal to $-(2^{N-1})$.

11. A system, comprising:
a processor configured to implement an encoding engine to receive an uncompressed warehouse data index, to divide the uncompressed warehouse data index into a plurality of portions, each portion representing less than an entirety of the warehouse data index and each portion including a predetermined number of contiguous rows of the warehouse data index;
the processor configured to encode different portions of the uncompressed warehouse data index using at least a first encoding technique and a second encoding technique that are different encoding techniques creating a compressed, encoded representation of each portion, wherein the first encoding technique is one of bitmap encoding and run length encoding; and
a compressed warehouse data index to store a compressed warehouse index in accordance with encoding results from the encoding engine.

12. The system of claim 11, wherein each portion of the uncompressed warehouse data index comprises a page of index entry information for a fixed number P of contiguous rows of index entry content.

13. A non-transitory computer-readable medium having stored thereon processor-executable instructions which when executed by a processor cause the processor to:
divide an uncompressed warehouse data index into a plurality of portions, each portion representing less than an entirety of the warehouse data index and each portion including a predetermined number of contiguous rows of the warehouse data index;
determine a first data density value associated with a first portion of the plurality of portions;
determine a second data density value associated with a second portion of the plurality of portions;
the determination of the first and the second data density values being based on a number of significant rows divided by a total number of respective rows in respective first and second portions of the plurality of portions;
based on the first data density value, encode the first portion using a first encoding technique to create a compressed, encoded representation of the first portion, wherein the first encoding technique is one of bitmap encoding and run length encoding;
based on the second data density value, encode the second portion using a second encoding technique, different than the first encoding technique, to create a compressed, encoded representation of the second portion; and
store the first and second compressed, encoded representations of the uncompressed data in accordance with results of said encodings of the first and second portions.

14. The non-transitory computer-readable medium of claim 13 having stored thereon processor-executable instructions that when executed by a processor cause the processor to:
receive a compressed representation of data;
evaluate a first header associated with a first portion of the compressed data;
evaluate a second header associated with a second portion of the compressed data;
based on the first header, decode the first portion using a first decoding technique, to create an uncompressed, decoded representation of the first portion, wherein the first decoding technique is one of bitmap decoding and run length decoding;
based on the second header, decode the second portion using a second decoding technique, different than the first decoding technique, to create an uncompressed, decoded representation of the second portion; and
store the first and second uncompressed, decoded representations of the compressed data in accordance with results of said decodings of the first and second portions.

15. The medium of claim 14, wherein each portion of the compressed data represents a page of warehouse data index entry information for a fixed number P of contiguous rows of warehouse data index entry content.

16. The medium of claim 14, wherein the first decoding technique is associated with run length decoding, where a sequence of natural numbers is represented as a bitmap and intervals between significant bits are encoded as binary words.

17. The medium of claim 16, wherein the second decoding technique is associated with bitmap decoding, where a set of natural numbers is represented as a bitmap and an nth position denotes that an nth row contains a key value.

* * * * *